United States Patent [19]

Lane et al.

[11] Patent Number: 4,946,820

[45] Date of Patent: Aug. 7, 1990

[54] PREPARATION AND USE OF TIN (IV) OXIDE DISPERSION

[75] Inventors: Edward S. Lane, Southampton; David L. Segal, Harwell; Donald F. Rush, Didcot, all of United Kingdom

[73] Assignee: United Kingdom Atomic Energy Authority, London, England

[21] Appl. No.: 382,496

[22] Filed: Jul. 21, 1989

[30] Foreign Application Priority Data

Jul. 22, 1988 [GB] United Kingdom ............... 8817541
Jul. 22, 1988 [GB] United Kingdom ............... 8817540

[51] Int. Cl.$^5$ .................... B01J 23/14; B01J 23/26; B01J 23/72

[52] U.S. Cl. ................... 502/310; 252/313.1; 252/315.2; 502/304; 502/352

[58] Field of Search ............. 502/304, 310, 352; 252/313.1, 315.2

[56] References Cited

U.S. PATENT DOCUMENTS 3,462,373  8/1969  Jongkind ................ 252/313.1
4,830,844  5/1989  Kolts ..................... 502/310 X

FOREIGN PATENT DOCUMENTS 2134004   8/1984  United Kingdom ........ 502/310
88100859  2/1988  World Int. Prop. O. ..... 502/310

Primary Examiner—W. J. Shine
Attorney, Agent, or Firm—Larson and Taylor

[57] ABSTRACT

A tin(IV) oxide dispersion is prepared by peptising metastannic acid with an amine peptising agent such as n-butylamine or cyclohexylamine. The dispesion may be a sol or an intermediate convertible to a sol, and may include other components such as metal oxides or their precursors, e.g. one or more of a high surface area alumina and transition metal oxides such as copper(II) oxide and chromium (VI) oxide. The dispersion may be converted to a gel and then to a ceramic, optionally after the sol has been contacted with a substrate, for example to produce a catalyst. Further coatings may be applied to produce a catalyst comprising a mixture of tin(IV) oxide and chromium(VI) oxide on the substrate which may be effective as an oxidation catalyst and useful in the treatment of vehicle exhaust emissions.

10 Claims, No Drawings

PREPARATION AND USE OF TIN (IV) OXIDE DISPERSION

This invention relates to the preparation of tin(IV) oxide dispersions such as sols, their conversion to gels and ceramics, and their use in coating substrates.

Tin(IV) oxide is known as a component of a catalyst, either along or in combination. See, for example, GB-A-No. 2 028 571, EP-A-No. 0 116 785 and EP-A-No. 0 256 822. It is also known, for example from the latter two references, to use dispersions of tin(IV) oxide, e.g. sols, to prepare catalysts that include tin(IV) oxide.

EP-A-No. 0 116 785 also describes, with reference to GB-A-No. 2 126 205, a way of preparing a tin(IV) oxide sol, namely by peptising hydrous stannic oxide with a quaternary ammonium hydroxide such as tetramethylammonium hydroxide, tetraethylammonium hydroxide, methyltriethanolammonium hydroxide, and 2-hydroxyethyltrimethylammonium hydroxide.

It has now been found that amines may, to advantage, be used as peptising agents to produce dispersions of tin(IV) oxide. Thus, the invention provide a process for preparing a dispersion of tin(IV) oxide which includes the step of peptising metastannic acid with a primary, secondary or tertiary amine peptising agent.

It should be noted that "tin(IV) oxide" in this specification includes stoichiometric $SnO_2$ and also non-stoichiometric compounds having the formula $SnO_{2-x}$, where x is finite and is a small fraction, and that metastannic acid is also known as beta-stannic acid and may be regarded as a hydrated form of tin(IV) oxide.

Surprisingly, amines have been found to be capable of successfully peptising metastannic acid to give rise to sols of higher concentration and lower viscosity than quaternary ammonium peptising agents, notwithstanding the fact that amines are weak bases cf. quarternary ammonium compounds which are strong electrolytes.

The method of the invention may be carried out to a sufficient extent that a sol (i.e. a colloidal solution) such as a transparent sol is prepared. Alternatively, it may be carried out to prepare a stable suspension containing a colloidal component. Thus, peptisation may be arrested when a stable suspension is formed and before all of the metastannic acid is peptised. Possibly, a stable suspension so produced may contain both a colloidal component and particles of larger particle size held in suspension in the colloidal component. Thus, "dispersion", in this specification, includes both a true colloidal solution (i.e. a sol) and a stable suspension which has a colloidal component.

Also, the peptisation need not necessarily lead to a colloidal dispersion directly. For example, the present method may be performed to give an intermediate material, such as a paste, which may be further treated to give a colloidal dispersion (e.g. by drying to give a gel which gel may then be dispersed in water to give a colloidal dispersion).

Preferably, an undesirable amount of water is not removed from the metastannic acid prior to peptising, i.e. it is not dewatered to an extent which inhibits, or deleteriously interferes with, the peptising process. It is particularly preferred that the metastannic acid is freshly prepared and substantially amorphous.

Metastannic acid for use in the invention may be prepared by any convenient method, of which the following are examples:

(a) reaction of tin with aqueous $NHO_3$;
(b) acidification of an alkali metal compound;
(c) hydrolysis of a salt solution;
(d) deanionisation of a salt solution.

Examples of amines which may be used in the present invention are n-butylamine, cyclohexylamine, methylamine, ethylamine, monoethanolamine, diethylamine, morpholine, N-methylglucosamine and dimethylaminoethanol.

The cation effecting peptisation in the present invention may be oxidatively removed by heating in air at a relatively low temperature (e.g. approximately 350° C. to 500° C.). Thus, the dispersion prepared may be free of such quantities of ions (e.g. sodium and potassium) as would be deleterious in many ceramic and electroceramic applications.

Also, dispersions prepared using metastannic acid derived from tin metal may contain very low concentrations of chloride and sodium ions which can be advantageous in the preparation of materials such as ceramics and catalysts.

The present invention may be performed by contacting the metastannic acid and the amine in the presence of water, if desired, with the application of heat and agitation.

The amines used may, for example, have dissociation constants (pKa) of 8 or greater. Some amines with a pKa of less than 8 may give rise to dispersions which are not transparent aqueous sols but which, however, may be suitable for applications where a transparent sol is not required or is not suitable.

The ratio of amine to metastannic acid required to produce a dispersion may depend upon the amine used. However, 0.2 to 0.5 mole of amine per mole of metastannic acid is an example of a range that has been used successfully in the present invention.

The viscosity of dispersions obtained may vary according to the amine used. For example, aqueous sols of relatively low viscosity (e.g. suitable for impregnating catalyst substrates) may be prepared using cyclohexylamine or n-butylamine. The viscosity of some dispersions may be reduced by using excess amine or by subsequently adding an amine different from that used to form the dispersion.

A preferred embodiment of the invention is a process for preparing a dispersion of tin(IV) oxide which includes contacting metastannic acid with n-butylamine to produce an intermediate material and subsequently treating the intermediate material to produce a tin(IV) oxide sol, for example, by drying the intermediate material to form a gel and dispersing the gel in an aqueous medium.

One or more other chemical compounds (e.g. metal oxides or precursors) may be incorporated in the dispersion; they may, for example, be added in the form of a sol (e.g. an alumina sol), or of a solution (e.g. chromic acid).

The other chemical compounds may comprise a ceramic oxide such as alumina, transition metal oxides (such as copper(II) oxide and chromium(VI) oxide), and cerium(IV) oxide.

The ceramic oxide may be a high surface area ceramic oxide where "high surface area" includes $70m^2g^{-1}$ or greater, for example $80-100m^2g^{-1}$. A specific example is alumina having a specific surface below 1100° C. or not less than $70m^2g^{-1}$ (e.g. in the range $80m^2g^{-1}$ to $100 m^{2-1}$) and whose total pore volume at a temperature below 1100° C. is not less than 0.50 dm$^3$kg$^{-1}$ (e.g. in the range from 0.50 dm$^3$kg$^{-1}$ to 0.85 dm$^3$kg$^{-1}$).

Other examples of the ceramic oxide are beryllium oxide, zirconium(IV) oxide, thorium(IV) oxide, and silicon(IV) oxide. The ceramic oxide preferably has a structure comprising loose aggregates of primary-particles, in which aggregates there are point to point contacts between the primary-particles and spaces within the structure. Such a structure is able substantially to maintain its surface area after heat treating because the point to point contacts offer few opportunities for sintering and hence loss of surface are. Colloidal particles of such a ceramic oxide can be made by dispersing in water a powder made by a vapour condensation method such as flame hydrolysis, for example as described in GB-A-No. 1 567 003. The use of such particles for coating substrates is described in GB-A-No. 1 568 861.

Further, the gel may be converted to a ceramic, for example by heating to give ceramic particles, e.g. useful as catalysts.

If desired the dispersion prepared by the present method may be contacted with a substrate before being converted to a gel and to a ceramic, thereby to form a ceramic coating on the substrate, for example to produce a catalyst. Further, the substrate carrying the ceramic coating may be provided with one or more additional coatings, for example by contacting with a second and, optionally, subsequent dispersion followed by drying and fining. Preferably, the second dispersion comprises a chromium(VI) compound in a liquid medium, which compound is converted to chromium(VI) oxide thereby to give a mixture comprising tin(IV) oxide and chromium(VI) oxide on the substrate. The second and subsequent dispersions may have other chemical compounds incorporated therein such as exemplified above in relation to the dispersion of the invention.

The substrate may be non-metallic or metallic, though the former is preferred. It may, for example, be constituted by a single artefact in the form of a porous ceramic such as porous α-Al$_2$O$_3$ or cordierite fabricated into a monolith having a plurality of internal channels for gas flow. If a single artefact is incapable of providing the desired activity, a plurality of artefacts may be used to constitute the substrate.

The use of a tin(IV) oxide sol made by peptising metastannic acid has a number of advantages in the preparation of a catalyst: it can be prepared in very pure form, for example, without the use or presence of chloride ions, which are known to be deleterious to the efficacy of a catalyst; it adheres outstandingly well to a range of substrates such as those used in the preparation of vehicle exhaust emission catalysts.

Catalysts made according to the present method have been found to be particularly useful in catalysing oxidation reactions such as the oxidation of hydrocarbons. They therefore have potential but not exclusive application in the catalytic treatment of the noxious emissions of vehicle exhausts.

The invention will now be further described, by way of example only, as follows where Examples 1 to 11 describe the preparation of dispersions, Examples 12 to 14 the preparation of catalysts carried on substrates, and Examples 15 and 16 the preparation of catalytic powders.

EXAMPLE 1

Granulated tin metal (100g; A.R. quality) was added in portions to a mixture of concentrated nitric acid (300 ml) and water (600 ml) contained in a 2 litre beaker. The mixture was slurried and cooled so that the temperature never exceeded 60° C. The resulting reaction mixture was allowed to stand for 48 hours, the resulting clear supernate drawn off, and the remaining residue diluted with water (1 ). The slurry thus formed was neutralised by addition of ammonia liquor and allowed to settle. The resulting supernate was drawn off and the residue filtered off (using a Buchner funnel and vacuum pump) and washed with water. The resulting washed cake was triturated at room temperature with cyclohexylamine (48 ml) and the stiff paste obtained evaporated to dryness on a steam bath. The pale pink solid obtained was readily soluble in water to give a transparent, limpid sol.

EXAMPLE 2

Filtered washed meta-stannic acid (obtained commercially as a slurry ex Keeling and Walker plc, Stoke on Trent, ST4 4JA, England) was stirred with morpholine (5g) to give a stiff, transparent paste (83g). This paste was evaporated on a steam bath to give a transparent, straw-coloured gel (35g) which was hard and brittle and could be redispersed in water to a transparent sol.

EXAMPLE 3

Filtered meta-stannic acid (as used in Example 2) was washed with dilute ammonia solution and mixed to form a slurry in water with diethylamine (10g). A transparent, straw-coloured sol (300g) was obtained which was dried in a stream of air at room temperature to give a gel (107g).

EXAMPLE 4

A well washed slurry of meta-stannic acid as used in Example 2) was added to morpholine (5g). The resulting mixture was stirred and warmed on a hot plate to form a stiff, transparent paste (82.6 g). This paste was evaporated to dryness on a steam bath to a transparent, straw-coloured gel (34.3 g) which was hard and brittle.

EXAMPLE 5

A well washed slurry of meta-stannic acid (as used in Example 2) was added to cyclohexylamine (8.4 g) and the resulting mixture was stirred and heated to form a stiff, white, opaque paste. This paste was evaporated to dryness on a steam bath to form a granular, white powder (67 g) which was then dispersed in water to give a transparent, colourless sol.

EXAMPLE 6

Tin metal (25 g; AR, granulated) was immersed in dilute nitric acid overnight. The resulting mixture was stirred and decanted. The residue was filtered off and washed with dilute ammonia solution. .The wet cake thus produced was triturated with N-methyl glucamine (8 g) to give a mobile, translucent sol.

EXAMPLE 7

Meta-stannic acid slop (200 ml; as used in Example 2) was centrifuged. The resultant solid was collected and dilute ammonium hydroxide was added to it until the pH had increased to 10. The resulting suspension was repeatedly centrifuged and the solid component washed with demineralised water until the conductivity of the supernatant had fallen to <3 mmho. N-Butylamine (10 ml) was then added until the mixture went clear. This mixture was diluted to give a translucent sol with an oxide concentration of 268 gl$^{-1}$.

EXAMPLE 8

A chromic acid solution (2M) was added to a sample of sol produced as in Example 7. Gelation occurred on adding the acid to the sol. The resulting gel was dried in an oven at 60° C. and calcined to oxide at 350° C.

The proportions of the sol to the chromic acid were chosen so that the composition was $SnO_2$ containing 5 weight % $CrO_3$.

EXAMPLE 9

The procedure of Example 8 was followed with the exception that the proportions of chromic acid to sol were chosen so that the composition was $SnO_2$ containing 20 weight % $CrO_3$.

EXAMPLE 10

An alumina sol (prepared by forming an aqueous dispersion of an alumina powder in water as disclosed in GB-A-No. 1567003) was mixed with a sample of sol produced as in Example 7 above and 2M chromic acid solution was added to the resulting dispersion to give a gel.

The gel was dried in an oven at 100° C. and calcined to oxide at 400° C.

The proportions of the sols and the chromic acid were chosen so that the composition was 16.2 weight % $CrO_3$-27.9 weight % $SnO_2$-55.9 weight % $Al_2O_3$.

EXAMPLE 11

(i) A cordierite monolith as substrate was immersed in a tin(IV) oxide sol prepared as in Example 7 and dried in an oven at 100° C.

(ii) The product of step (i) above was immersed in a chromic acid solution (2M), dried at 100° C. and subsequently calcined in air at 400° C. to give a catalyst in the form of a cordierite substrate carrying a dispersion of tin(IV) oxide and chromium(IV) oxide.

The catalyst produced was found, in a standard test, to be catalytically active for the combustion of propane.

EXAMPLE 12

(i) Step (i) as described in Example 11 was carried out using a tin(IV) oxide sol prepared as described in Example 7 mixed with an alumina sol made as described in GB-A-No. 1 567 003, i.e. by dispersing in water an alumina powder made by flame hydrolysis. The resulting sol had a total oxide concentration of 100 gl$^{-1}$ and a tin(IV) oxide concentration of 33.4 gl$^{-1}$.

(ii) Step (ii) as described in Example 11 was carried out to give a catalyst in the form of a cordierite substrate carrying a dispersion of tin(IV) oxide, alumina and chromium(IV) oxide.

The catalyst produced was found, in a standard test, to be catalytically active for the combustion of propane.

EXAMPLE 13

The procedure of Example 11 was carried out with the exception that, in step (ii), the solution was made by dissolving $CrO_3$(8.09 g) in water (50 cm$^3$) and adding 5 cm$^3$ of this solution to a solution of copper nitrate (2.45 g) in water (5 cm$^3$).

EXAMPLE 14

The procedure of Example 13 was carried out with the exception that, in step (i), the monolith was dip coated in a tin(IV) oxide sol (10 cm$^3$) prepared as in Example 7 to which had been added an alumina sol (35.2 cm$^3$; 150 gl$^{-1}$) made as described in GB-A-No. 1 567 003.

EXAMPLE 15

A dispersion was made by dissolving $CrO_3$(8.09 g) in water (50 cm$^3$) and adding CuO(2.45 g), and the dispersion added to a tin(IV) oxide sol (10cm$^3$; 264 gl$^{-1}$ oxide), followed by drying at 100° C. and calcining at 350° C. Decomposition was smooth and gave a powder of composition by weight: 62% $SnO_2$; 19% CuO, and 19% $CrO_3$.

EXAMPLE 16

The $CrO_3$, $Cu(NO_3)_2$ solution as used in Example 13 was added to the $SnO_2$, $Al_2O_3$ sol as used in Example 14, dried at 100° C. and calcined at 400° C. Smooth decomposition occurred as confirmed by thermogravimetric analysis.

Tests showed that the presence of CuO in the products of Examples 13 to 16 promoted the catalytic conversion of CO to $CO_2$.

We claim:

1. A process for preparing a dispersion of tin(IV) oxide which includes the step of peptising metastannic acid with a primary, secondary or tertiary amine peptising agent 2. A process according to claim 1 wherein the dispersion is either a sol or an intermediate which is converted to a sol.

3. A process according to claim 1 wherein the amine is selected from n-butylamine, cyclohexylamine, ethylamine, monoethanolamine, diethylamine, morpholine, N-methylglucosamine, and dimethylaminoethanol.

4. A process according to claim 1 wherein the dispersion has one or more other metal oxides dispersed therein.

5. A process according to claim 4 wherein the one or more other metal oxides comprise alumina, one or more transition metal oxides, and cerium(IV) oxide.

6. A process according to claim 5 wherein the transition metal oxides are one or both of chromium(VI) oxide and copper(II) oxide.

7. A process according to claim 1 wherein the dispersion is converted to a gel and then to a ceramic.

8. A process according to claim 1 wherein the dispersion is contacted with a substrate and then converted to a gel and to a ceramic, thereby to form a ceramic coating on the substrate.

9. A process according to claim 8 wherein the ceramic coated substrate is contacted with a dispersion of a chromium(VI) compound in a liquid medium, followed by conversion of the compound to chromium(VI) oxide thereby to give a mixture comprising tin(IV) oxide and chromium(VI) oxide on the substrate.

10. A process according to claim 9 wherein the dispersion of chromium(VI) oxide also includes copper(II) oxide or a precursor therefor.

* * * * *